(12) United States Patent
Reusch et al.

(10) Patent No.: US 9,128,480 B2
(45) Date of Patent: Sep. 8, 2015

(54) SAFETY CONTROLLER AND METHOD FOR CONTROLLING AN AUTOMATED INSTALLATION

(75) Inventors: Matthias Reusch, Hohenstein (DE); Karsten Petzold, Stuttgart (DE); Michael Kling, Deizisau (DE); Patrick Schips, Wendlingen (DE); Bernd Banzhaf, Stuttgart (DE); Florian Stanko, Sersheim (DE); Herbert Walter, Schlierbach (DE); Timo Nawratil, Stuttgart (DE)

(73) Assignee: PILZ GMBH & CO. KG, Ostfildern (DE)

( * ) Notice: Subject to any disclaimer, the term of this patent is extended or adjusted under 35 U.S.C. 154(b) by 887 days.

(21) Appl. No.: 13/276,862

(22) Filed: Oct. 19, 2011

(65) Prior Publication Data
US 2012/0116541 A1    May 10, 2012

Related U.S. Application Data

(63) Continuation of application No. PCT/EP2010/002438, filed on Apr. 20, 2010.

(30) Foreign Application Priority Data

Apr. 20, 2009    (DE) .......................... 10 2009 019 096

(51) Int. Cl.
*G05B 19/418* (2006.01)
(52) U.S. Cl.
CPC    *G05B 19/41865* (2013.01); *G05B 2219/32283* (2013.01); *G05B 2219/33273* (2013.01); *G05B 2219/33338* (2013.01)
(58) Field of Classification Search
CPC ............... G05B 19/41865; G05B 2219/32283; G05B 2219/33273; G05B 2219/33338

USPC ........................... 700/7, 20, 86; 718/104–106
See application file for complete search history.

(56) References Cited

U.S. PATENT DOCUMENTS 5,699,242 A    12/1997 Togawa et al.
5,842,035 A *  11/1998 Nishikawa ...................... 712/14
(Continued)

FOREIGN PATENT DOCUMENTS

DE    199 06 695 A1    8/2000
DE    19906695 A1 *    8/2000
(Continued)

OTHER PUBLICATIONS

EN 954-1, Safety-related parts of control systems Part 1: General principles for design; Mar. 1997, 34 pages.
(Continued)

*Primary Examiner* — Robert Fennema
*Assistant Examiner* — Jennifer L Norton
(74) *Attorney, Agent, or Firm* — Harness, Dickey & Pierce, P.L.C.

(57) ABSTRACT

A safety controller controls an automated installation on the basis of project data representing an individual application running. The safety controller has a plurality of controller hardware components. At least some controller hardware components have a respective project data memory. The project data memories each are designed to store project data supplied to them. The safety controller includes a connecting unit, such as a communication network, which connects the controller hardware components to one another. The safety controller also has a distribution unit for distributing at least some of the project data via the connecting unit to at least some of the project data memories.

12 Claims, 6 Drawing Sheets

(56) References Cited

U.S. PATENT DOCUMENTS

| | | | |
|---|---|---|---|
| 5,896,289 A * | 4/1999 | Struger | 700/9 |
| 7,024,463 B1 | 4/2006 | Hitomi et al. | |
| 7,519,968 B2 * | 4/2009 | Koyama et al. | 718/105 |
| 8,166,532 B2 * | 4/2012 | Chowdhury et al. | 726/9 |
| 2003/0105537 A1 * | 6/2003 | Crispin et al. | 700/20 |
| 2004/0064205 A1 | 4/2004 | Kloper et al. | |
| 2004/0230980 A1 * | 11/2004 | Koyama et al. | 718/103 |
| 2006/0178757 A1 * | 8/2006 | Grgic et al. | 700/9 |
| 2008/0306613 A1 * | 12/2008 | Muneta et al. | 700/7 |
| 2010/0121465 A1 * | 5/2010 | Kanbara et al. | 700/7 |
| 2012/0078392 A1 * | 3/2012 | Woehrle et al. | 700/86 |
| 2012/0198464 A1 * | 8/2012 | Taira et al. | 718/103 |

FOREIGN PATENT DOCUMENTS

| | | |
|---|---|---|
| EP | 1076275 A2 * | 2/2001 |
| EP | 1 231 526 A1 | 8/2002 |
| EP | 1 362 269 B1 | 11/2003 |
| JP | 2000-259589 | 9/2000 |
| JP | 2002-297209 | 10/2002 |
| JP | 2003-186507 | 7/2003 |
| JP | 2006-048318 | 2/2006 |
| JP | 2008-234394 | 10/2008 |
| JP | 2009-42913 | 2/2009 |
| WO | WO 2007/075097 A1 | 7/2007 |

OTHER PUBLICATIONS

EN ISO 13849-1, Safety of machinery— Safety-related parts of control systems— Part 1: General principles for design, Nov. 2006; 96 pages.

CEI IEC 61508-2, Functional safety of electrical/electronic/programmable elecgtronic safety-related systems— Part 2: Requirements for electrical/electronic/programmable electronic safety-related systems, 150 pages.

ISA/EP; English language translation of Written Opinion of the International Searching Authority; Apr. 2007; 9 pages.

* cited by examiner

SAFETY CONTROLLER AND METHOD FOR CONTROLLING AN AUTOMATED INSTALLATION

CROSSREFERENCES TO RELATED APPLICATIONS

This application is a continuation of international patent application PCT/EP2010/002438 filed on Apr. 20, 2010 designating the U.S., which international patent application has been published in German language and claims priority from German patent application DE 10 2009 019 096.1 filed on Apr. 20, 2009. The entire contents of these priority applications are incorporated herein by reference.

BACKGROUND OF THE INVENTION

The present invention relates to a safety controller and to a method for controlling an automated installation based on project data, wherein the project data represent an application running on the installation.

A safety controller in terms of the present invention is an apparatus or a device which receives input signals supplied by sensors and generates output signals from these input signals by means of logical combinations and possibly further signal or data processing steps. The output signals can then be supplied to actuators which effect actions or reactions in a controlled installation based on the input signals.

A preferred field of application for such safety controllers is the monitoring of emergency-off pushbuttons, two-hand controllers, protective doors or light grids in the area of machine safety. Such sensors are used for safeguarding, by way of example, a machine which, in operation, is a danger to persons or material goods. When the protective door is opened or the emergency-off pushbutton is operated, a respective signal is generated and supplied as an input signal to the safety controller. As a response, the safety controller then switches off the dangerous part of the machine with the aid of an actuator, for example.

In contrast to a "normal" controller, it is characteristic of a safety controller that the safety controller always ensures a safe state of the dangerous installations or machines even if the safety controller itself or a device connected to it has a malfunction. Therefore, extremely high requirements are placed on the inherent failsafety of safety controllers which leads to a considerable outlay for development and production.

As a rule, before safety controllers are used, they require a special approval from a relevant supervisory authority such as, for example, the professional associations or what is called TÜV in Germany. In this context, the safety controller must meet predetermined safety standards which are defined, for example, in European Standard EN 954-1 or a comparable standard, such as IEC 61508 or EN ISO 13849-1. In the text which follows, a safety controller is therefore understood to be an apparatus or a device which meets at least the safety category 3 of the European Standard EN 954-1, or a Safety Integrity Level (SIL) 2 according to the IEC 61508 Standard.

A programmable safety controller allows the user to individually define the logical combinations and possibly other signal or data processing steps with the aid of a software, the so-called user program, in accordance with its needs. This results in great flexibility in comparison with earlier solutions, in which the logical combinations were established by a defined hardwiring of various safety modules. A user program can be generated, for example, with the aid of a commercially available personal computer (PC) and by using appropriate software programs. In this context, the term user program is understood to mean that a user program may comprise both source code and machine code.

In the case of large, and thus complex, installations of the prior art, which are constructed with a plurality of installation hardware components, distributed safety controllers are normally used. Distributed safety controllers comprise a plurality of controller hardware components. These are control units, sensors and actuators. The individual controller hardware components are allocated to individual installation hardware components. With regard to the hardware, distributed safety controllers are characterized by great flexibility. Thus, a safety controller can be constructed from an arbitrary number of different controller hardware components and thus adapted very flexibly to the given situations of the installation to be controlled. With regard to programming or software-related implementation and thus the concerns of data processing, distributed safety controllers are not yet optimal, however. Thus, a distribution of project data, i.e. data which represent an application running on the controlled installation, to the individual controller hardware components is not provided. This not only restricts the flexibility possible with regard to the hardware implementation to a considerable extent but also entails further disadvantages. Due to the fact that the project data cannot be distributed and thus processed "on site", a considerable data exchange is required between distant controller hardware components. This leads to an impairment, more precisely to an increase in the response time of the safety controller. "On site" means in this context that the project data are processed where the data needed for such processing are actually available; for example, in a control unit located right in the vicinity of a sensor which provides an input signal for determining a drive signal for an actuator. Or the processing even takes place in the sensor itself. Instead, appropriately designed controller hardware components and data buses which permit a higher data exchange than is actually required are used in order to avoid an impairment of the response time. This increases the cost for implementing a safety controller. With respect to the cost, it is also of disadvantage that any free memory which may be present, especially data memory, in individual controller hardware components, such as in intelligent sensors and intelligent actuators, is not used and, instead, the data memory contained in control units must be dimensioned to be larger than would actually be required.

SUMMARY OF THE INVENTION

It is an object of the present invention, therefore, to provide a safety controller and a method of the type initially mentioned in order to reduce the response time of a safety controller and, at the same time, to reduce the cost for implementing a safety controller in order to thus provide for a more rapid, more flexible safety controller optimized with regard to its availability.

According to an aspect of the invention, there is provided a safety controller for controlling an automated installation on the basis of project data, wherein the project data define an application running on the installation, comprising a plurality of controller hardware components, wherein at least some of the controller hardware components comprise a respective project data memory, with the project data memories each being designed for storing project data supplied to them, a connecting unit via which the controller hardware components are connected to one another, and a distribution unit that is designed for distributing at least some of the project data via the connecting unit to at least some of the project data memories.

There is also provided a method for controlling an automated installation on the basis of project data loaded onto a safety controller, wherein the project data define an application implemented on the installation, wherein the safety controller comprises a plurality of controller hardware components connected to one another via a connecting unit, wherein at least some of the controller hardware components comprise a respective project data memory, and wherein the project data memories each are designed for storing project data, the method comprising the steps of generating the project data using a programming tool; and distributing at least some of the project data across the controller hardware components by dividing the project data into data packets and by transferring and storing said data packets in the project data memories of said plurality of controller hardware components.

The novel safety controller and the novel method are based on the concept of providing a distribution unit in a safety controller, which distribution unit is designed for distributing at least some of the project data to data memories located in the controller hardware components, and thus for distributing project data to controller hardware components of which the safety controller is constructed. The project data can thus be stored selectively in individual data memories which are contained in various controller hardware components. This makes it possible to store project data also in so-called intelligent input/output units. These are sensors and actuators which have data processing units, such as microprocessors, and data memories. As a result, data memories existing in a safety controller, which would otherwise remain largely unused, can be occupied with project data and thus utilized. As a result, control units existing in a safety controller can be equipped with smaller data memories in future. This reduces the costs for a safety controller.

At the same time, the response time of a safety controller is reduced. Project data can be stored, and are thus available, where, for example, required sensor signals originate from or actuators drive signals have to be provided. This reduces the data exchange which finally leads to a reduction in the response time. The reduction of the data exchange also leads to an increase in the availability of the safety controller. Since fewer data are to be exchanged, fewer data transmission errors also occur.

Distributing and thus storing project data in a number of project data memories also has advantages with regard to implementation and handling of a safety controller. If, for example, after the project work on a safety controller, it is found in trial operation that the storage capacity existing in the safety controller and formed by all data memories is too low, it can be enlarged by inserting an additional controller hardware component which has a data memory. The project data can then be distributed anew to the previous data memories and the additional one. The safety controller can thus be arbitrarily scaled.

If the data memory located in a controller hardware component is designed as a removable memory card, for example, the project data needed for the new controller hardware component can be provided in a simple manner during an exchange of equipment, if required. It is sufficient to remove the memory card from the defective controller hardware component, and to insert it into the replacement controller hardware component. Thus, for example, address data, configuration data and program data can be provided without having to connect a notebook, for example, to the new controller hardware component for this purpose.

In a refinement, the distribution unit is comprised by one of the project data memories.

This refinement has the advantage that no additional unit needs to be provided in the safety controller just for distributing the project data. The distribution of the project data is performed by one of the project data memories present in the safety controller in any case. This provides for a cost-effective implementation of the safety controller. A further advantage consists in that functionalities present in a project data memory and optimized with regard to processing project data can be used for distributing the project data. The interface of a project data memory is quoted as an example. The project data memory which is used as distribution unit has the function of a master in the distribution of the project data. The remaining project data memories each assume the function of a slave. The project data memory which is used as distribution unit advantageously has a greater storage capacity than would be required for the operation of the controller hardware component in which it is arranged. The reason for this is the following: during the distribution of the project data, data are generated which are needed for the later operation of the safety controller. These can thus be temporarily stored in said project data memory.

The project data are usually generated by using a programming tool running on a programming unit. As a rule, this is a unit constructionally separated from the safety controller. The programming unit comprises, for example, a computer constructed as personal computer. Several alternatives are feasible for transmitting the project data from the programming unit to the project data memory which is used as distribution unit. Thus, the programming unit can be connected, for example, via a cable, to the controller hardware component in which the project data memory is contained, or even to the project data memory itself. This embodiment is especially suitable for when the complete project data are to be fed into the safety controller in a single process. In a further embodiment, the project data can be transferred to the project data memory by using a mobile storage medium. For example, memory cards which can be designed as SD (Secure Digital) memory card or CF (Compact Flash) card, or a USB (Universal Serial Bus) stick can be considered as mobile storage medium. When a mobile storage medium is used, it is advantageous for the initialization of the distribution process to carry out a deliberate user action. For example, a certain key combination must be pressed, or a button operated, or a defined input performed via a graphical interface at the controller hardware component into which the mobile storage medium is inserted. In the direct transmission of the project data from the programming unit to the project data memory, the distribution process is advantageously initialized automatically by the programming unit.

Using a mobile storage medium has various advantages. It is thus possible to feed project data only to selected controller hardware components by connecting the mobile storage medium selectively to these controller hardware components. A further advantage is then that the mobile storage medium can also be used for security purposes. Thus, the machine code stored in a safety controller can be stored on the mobile storage medium and read into the safety controller again when needed.

In a further refinement, the distribution unit is an external distribution unit which is connected at least temporarily to an interface provided for this purpose in the safety controller.

It is especially advantageous if the external distribution unit is located in the programming unit on which the programming tool is running with which the project data are generated. As a result, the project data can be transferred directly from the programming unit to the safety controller. On the one hand, this is less complex. On the other hand, it increases the failsafety of the safety controller since potential fault sources with regard to the transmission of the project data are eliminated. A further advantage of this embodiment consists in that after completion of the project data in a so-called trial operation in which the functionality of the safety controller and the installation to be controlled is tested and in which it is possibly found that changes must be performed in the project data, these can be updated in a simple manner.

The project data are transmitted from the programming unit to the safety controller by cable, for example. In this context, the programming unit is advantageously not permanently connected to the safety controller, but only temporarily, such as for the period of programming, i.e. for the period in which the project data are generated. Or even only for the period during which the project data are transferred from the programming unit to the safety controller. The programming unit can be considered to be a part of the safety controller since the project data, especially the user program for the installation to be controlled are generated with the programming unit.

In a further refinement, at least one of the project data memories is also designed for forwarding project data supplied to it to at least one other project data memory, or requesting project data stored in another project data memory.

This refinement provides for a flexible distribution of the project data to the project data memories located in a safety controller. Due to the fact that one of the project data memories is designed for forwarding project data, it can be used for distributing the project data to the project data memories arranged in a safety controller. Due to the fact that at least one of the project data memories is designed for requesting project data from another project data memory, it is not necessary to store the project data needed in a controller hardware component in the project data memory arranged in this component. Instead, it is possible to store these project data in an arbitrary project data memory since these can be requested at any time. At least one of the project data memories is advantageously equipped with both functional features, i.e. designed both for forwarding project data and requesting project data. This provides for a particularly flexible distribution of the project data. A project data memory which is designed for storing, forwarding and requesting project data can also be called a project data server, abbreviated as project server, due to this range of functions.

In a further refinement, the controller hardware components are control units and/or sensors and/or actuators.

Thus, it is not only the memories present in control units which can be used as project data memories but also the memories present in so-called intelligent sensors and intelligent actuators. This provides for a particularly flexible distribution of the project data, especially so that the project data can be partially processed directly on site. This contributes to improving the response time of the safety controller.

In a further refinement, the project data are divided into a plurality of data packets, wherein the individual data packets are in each case allocated to at least one of the project data memories.

This refinement has the advantage that the project data can be selectively assigned to individual project data memories in accordance with a particular distribution criterion. A safety controller can thus be optimized with regard to different parameters by a corresponding choice of the distribution criterion.

In a further refinement, at least some of the controller hardware components comprise at least one data processing unit, wherein project data intended for the respective data processing unit are stored in the project data memory which is contained in the controller hardware component in which the data processing unit is located.

This principle of keeping the data locally, in which the project data are stored where they are processed, provides for fast and particularly effective processing of control tasks and thus a reduction in the response time of a safety controller. In the case of a data processing unit, this can be a unit which is supplied with data as input data for an operation and which outputs the output data determined as a result of this operation on the basis of the input data. However, a data processing unit can also be understood to be a unit which is supplied with data in order to forward them to another unit. Safety controllers contain data processing units in different embodiments. Thus, for example, data-based message switching units are used. These provide, for example, data generated by their own control unit to other control units and read in data generated by other control units which are needed in their own control unit for further processing. Such data processing units are known by the term data broker. They can also be event-based message switching units. Such message switching units send out a signal when a defined condition is met in their own control unit in order to trigger a defined response in another control unit or in the installation to be controlled. Such message switching units correspondingly also receive such signals. Such message switching units are known by the term event broker. Furthermore, connecting units are also used which are needed in order to enable data to be exchanged at all between individual controller hardware components. Such data processing units are called data bus interfaces. In addition, a project data memory is also a data processing unit since the project data memory cannot only store project data but also request and forward project data. The project data stored in each case for the data processing unit differ depending on how the data processing unit is equipped. For a data broker, an event broker or a data bus interface, configuration data and parameterization data are stored, for example. For a project data memory, project data are also stored in addition to parameterization data and configuration data, preferably those project data which are processed in the control unit in which the project data memory is contained.

In a further refinement, a programming unit is provided for generating the project data, wherein the programming unit is designed for generating allocation data, wherein the distribution unit is also designed for distributing the project data on the basis of the allocation data to the project data memories.

This refinement has the advantage that the project data can be distributed to the individual project data memories in accordance with an arbitrarily specifiable distribution criterion. At the same time, this ensures an error-free and, if required, arbitrarily frequently reproducible distribution of the project data. Concerning the connectability of the allocation data, different approaches are feasible. For example, the allocation data can have the nature of a proposal and represent a list of preferences which can be modified, for example, by the creator of the project data or the operator of the installation to be controlled. On the other hand, it can also be provided that a modification of the allocation data is not possible so that the distribution of the project data proceeds completely automatically in this case.

For example, the allocation data can include the following information: for each project data memory located in the safety controller, the data packets to be stored in it or the data packets then stored in it are listed. This establishes which data packet belongs to which controller hardware component or to which data processing unit, respectively. As well, the order of the project data memories in which they are taken into consideration during the distribution of the project data can be established by the allocation data. Such an order provides that the project data memory which is used as distribution unit is taken into consideration first in every case. The allocation data can contain for each individual project data memory an information item on which data packets are to be stored in the respective project data memory or are stored in it then, respectively. In addition, an information item which specifies on which project data memories the project data of the respective controller hardware component are located can be provided for each controller hardware component. This information item is needed, for example, during booting or reconfiguring of the safety controller. If this information is present, each controller hardware component and/or each data processing unit can call up the project data intended for it from the corresponding project data memories in which they are stored. It is also feasible to generate a partial volume of the allocation data only during the distribution process itself. This is available, for example, for the data which specify on which project data memories the project data of the respective controller hardware component are located.

In a further refinement, the programming unit is designed for determining the allocation data on the basis of at least one data processing characteristic figure.

The data processing characteristic figure in this case represents a parameter relevant to data processing of a component used in data processing. This can be, for example, the clock frequency of a microprocessor, the data rates of a data broker or of an event broker or of a data bus interface or the storage capacity of a project data memory. If data processing characteristic figures of the controller hardware components or of individual units installed in these are taken into consideration in the determination of the allocation data, the project data can be distributed from the point of view of an optimized data processing. Thus, project data, the processing of which requires a high computer power, which are stored, for example, in controller hardware components which are equipped with a high-performance microprocessor can be distributed from the point of view of optimized data processing. In addition, data packets can be distributed to the data memories present in the safety controller on the basis of their size. For example, small data packets can be stored selectively in data memories having small storage capacity. This refinement is advantageously suitable for completely automatic distribution of the project data to the project data memories.

In another refinement, the programming unit is designed for determining the allocation data on the basis of at least one function allocation quantity.

In this context, the function allocation quantity represents, for a single data packet or a compound of data packets, the project data memory in which this data packet or this compound is to be stored. The project data memory here is specified by the fact that the storing is to take place in the project data memory which is located in the controller hardware component, especially the control unit, in which the project data are processed. For example, due to the spatial vicinity of a sensor, the signals of which are needed as input signals, and/or the spatial vicinity of an actuator which is driven by the drive signals determined. This measure provides for a short response time of the safety controller since the project data are kept on site and thus the data exchange between individual controller hardware components is reduced to a minimum. The function allocation quantities are advantageously specified by the programmer of a user program by specifying which ranges of the user program are to run on which controller hardware components, for example control units.

In a further refinement, at least some of the project data is stored redundantly in the project data memories.

The redundant storage of the data packets is achieved by the respective data packets being doubled. The doubled data packets are then independently distributed to the project data memories, with the proviso that the original data packet and the doubled data packet are in each case stored in another project data memory. This measure has the advantage that the availability of the safety controller and thus of the controlled installation is increased. If, for example, a non-safety-related controller hardware component fails, the project data which were stored in its project data memory are still available as before since they are still present in another project data memory. This also facilitates the exchange of a defective controller hardware component. It is only necessary to exchange the defective component for a new component. The project data needed for the new component can be requested, for example, automatically from the respective project data memories in which they are still stored and stored in the project data memory of the new component. The redundant storage of the project data also provides for running individual control tasks in parallel.

In a further refinement, the project data comprise program data and/or configuration data and/or parameterization data.

In this context, the program data represent the user program and are generated when the user program is created. The configuration data represent individual part-aspects of the data transmission. These are, for example, a cycle time, interconnection data which specify which of the controller hardware components are connected to one another, or data which represent which sensors or actuators are allocated to which inputs or outputs of individual control units, or data which specify, for example the type of, data to be exchanged between individual controller hardware components. They are thus data which represent the configuration of the safety controller implemented as being distributed. The configuration data can be generated during the creation of the user program. However, they can also be generated and altered to a certain extent after generation of the user program. The parameterization data represent value ranges for individual variables or functionalities used in the user program. These data can be specified during the creation of the user program or generated at a later time. This measure provides for a particularly effective optimization of the safety controller with regard to the computer power or the response time. Thus, program data can be stored where they are processed. Configuration data and parameterization data can be stored where the units are installed for which they are intended.

In a further refinement, at least some of the project data memories are designed for storing the respectively supplied project data in a zero-voltage-proof manner.

This refinement has the advantage that the project data are still present, for example after a voltage failure or after the safety controller is switched off. This increases the availability of the safety controller. No reinitialization of the safety controller is required. For example, memory cards in the form of SD cards or CF cards are used for this purpose, or flash memories are used.

During the distribution of the project data to the individual project data memories, the progress of the distribution process can be indicated preferably by graphical means. As a result, an operator of the installation to be controlled, for example, can inform himself in a simple manner about the status of the distribution process.

Each controller hardware component preferably contains a project data memory. This provides for an optimum distribution of the project data. The project data are available at the sites at which they are needed.

The application running on the installation to be controlled can also be called a process which comprises both standard control tasks and safety control tasks.

Naturally, the features mentioned above and still to be explained in the text which follows can be used not only in the combination specified in each case but also in other combinations or by themselves, without departing from the scope of the present invention.

BRIEF DESCRIPTION OF THE DRAWINGS

Exemplary embodiments of the invention are shown in the drawing and will be explained in greater detail in the description following. In the drawing.

DESCRIPTION OF PREFERRED EMBODIMENTS

Figure 1:
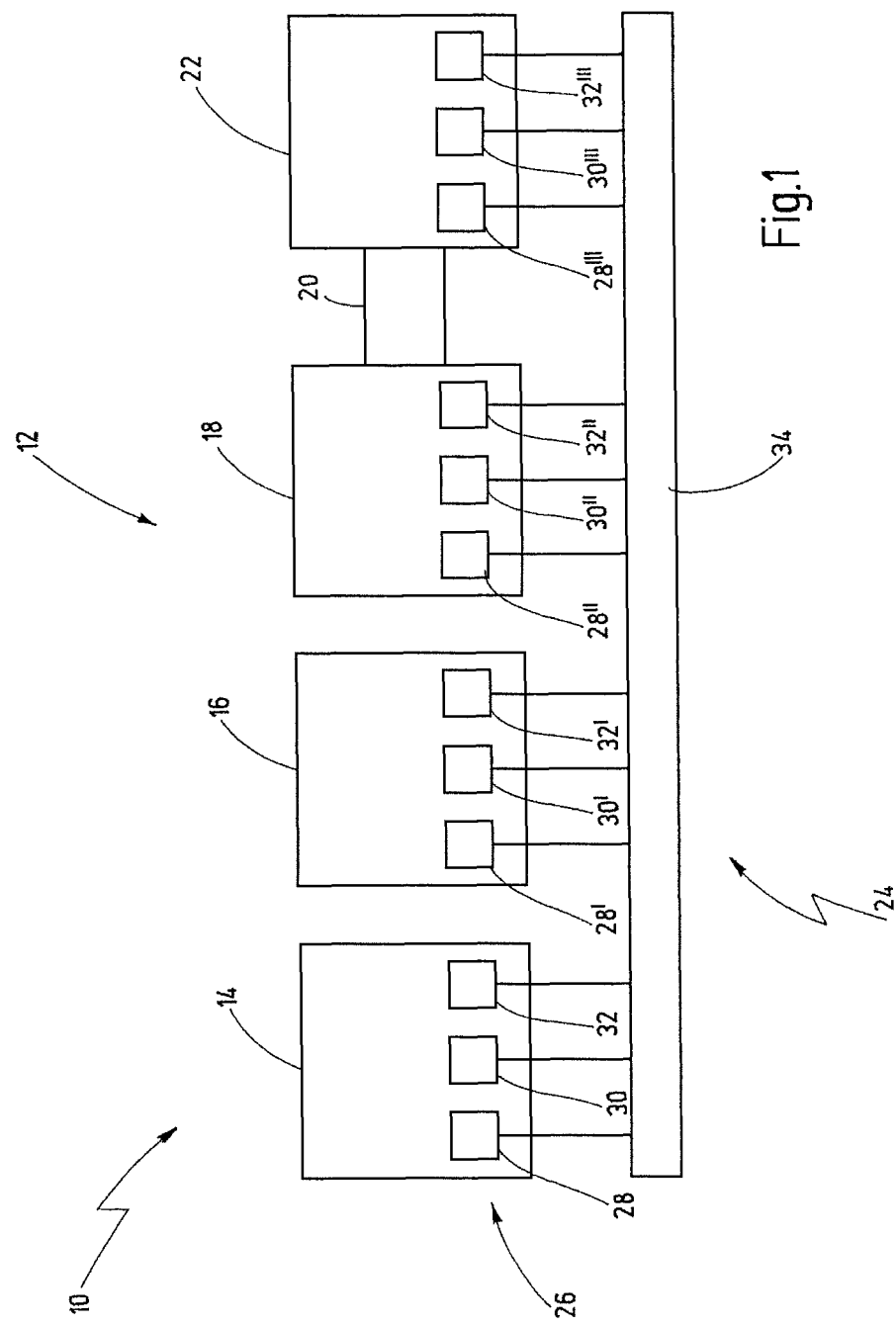
FIG. 1 shows a diagrammatic representation of a installation to be controlled.

In FIG. 1, a installation to be controlled is designated in its entirety by reference number 10. The installation 10 comprises a plurality of installation hardware components 12. In the present exemplary embodiment, there is a placement station 14, a processing station 16, a test station 18, a conveying unit 20 and a packing and palletizing station 22. Furthermore, a safety controller is designated by the reference number 24 in its entirety. The safety controller 24 contains a plurality of controller hardware components 26. The controller hardware components 26 are control units 28, sensors 30 and actuators 32. In this context, the individual control units 28, sensors 30 and individual actuators 32 are in each case allocated to one of the installation hardware components 12 and are spatially arranged there. The controller hardware components 12 are connected to one another via a connecting unit 34. The connecting unit 34 is a data bus which, for example, is designed as Ethernet-based field bus. A data bus installation is preferably used which operates in accordance with the SafetyNET p® communication model which is attributable to the applicant.

Using the placement station 14, the processing station 16 is filled with workpieces. These workpieces are processed in the processing station 16. Subsequently, the workpieces processed are forwarded by the processing station 16 to the test station 18 in which it is checked whether the workpiece processed meets corresponding test criteria. If these test criteria are met, the processing station 16 can be filled again with a new workpiece. The processed workpiece is transferred by means of the conveying unit 20 to the packing and palletizing station 22. In the latter, a number of processed workpieces are combined to form bundles which are then stacked on a pallet.

The working areas of the individual stations 14, 16, 18, 22 can be secured, for example, by protective doors which are equipped with safety switches having locking bolts with latching. As an alternative or supplementarily, light grids or light curtains can also be used. In addition, the individual stations 14, 16, 18, 22 can be provided with emergency-off pushbuttons by means of which the respective station can be brought into a safe state by being separated from the power supply. For this purpose, circuit breakers are correspondingly driven. The aforementioned protective doors, light grids, light curtains and emergency-off pushbuttons are safety-related sensors which are contained in the sensors 30. The circuit breakers are safety-related actuators which are contained in the actuators 32. The sensors 30 can also comprise non-safety-related sensors. These are sensors which detect operating variables, for example input variables needed for drive or position regulation such as rotational speeds, angles or velocities. The actuators 32 can also comprise non-safety-related actuators. These can be, for example, motors or positioning cylinders.

In the present exemplary embodiment, a control unit 28 is allocated to each station 14, 16, 18, 22. For this purpose, the control units 28 are designed as independent components. This also applies to the sensors 30 and the actuators 32. However, this embodiment is not to be construed as limiting. It is also feasible to allocate a common control unit, for example, to two stations. The individual installation hardware components can be constructionally and spatially separate from one another. However, it is also feasible that individual ones of these components are operatively connected to one another.

In FIG. 1, components of identical function are designated with the same reference number, the use of dashes indicating that the individual components of the same reference number can be formed quite differently due to the individual allocation to individual installation hardware components. This also applies correspondingly to signals. This form of identification also applies to the other figures.

Figure 2:
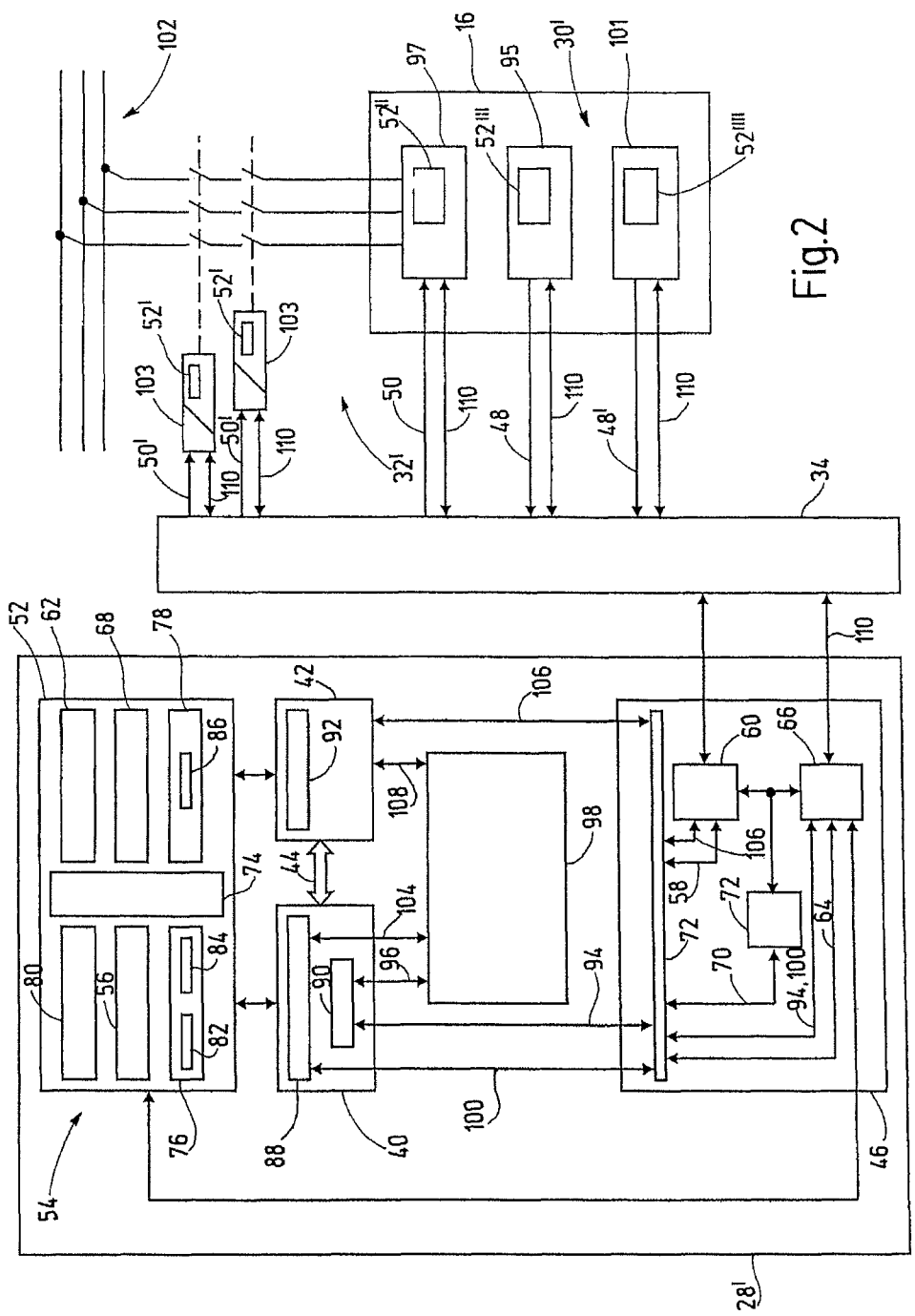
FIG. 2 shows a diagrammatic representation of controller hardware components arranged at a installation hardware component.

FIG. 2 shows in a more detailed representation the processing station 16 and its associated controller hardware components. These are the control unit 28', the sensors 30' and the actuators 32' which are connected to one another by the connecting unit 34.

The control unit 28' is constructed with a two-channel redundancy in order to achieve the required failsafety for controlling safety-critical applications or processes. FIG. 2 shows two separate processors, namely a first processor 40 and a second processor 42, as representative of the two-channel structure. The two processors 40, 42 are connected to one another via a bidirectional communication interface 44 in order to be able to monitor one another and exchange data. The two channels of the control unit 28' and the two processors 40, 42 preferably have a diverse design, i.e. they are different from one another in order to eliminate systematic failures as far as possible.

An input/output unit which is connected to each of the two processors 40, 42 is designated by reference number 46. The input/output unit 46 receives controller input signals 48 from the sensors 30' and forwards these in an adapted data format to each of the two processors 40, 42. Furthermore, the input/output unit 46 generates, under the control of the processors 40, 42, controller output signals 50 by means of which the actuators 32' are driven.

Reference number 52 designates a project data memory in which project data 54 are stored in the form of data packets. This includes a first data packet 56 which contains first configuration data 58 for a data broker 60. The project data memory 52 contains a second data packet 62 with second configuration data 64 for an event broker 66. The project data memory 52 contains a third data packet 68 with third configuration data 70 for a data bus interface 72. The project data memory 52 further contains a fourth data packet which contains configuration data for the project data memory 52 itself. In addition, the project data memory 52 contains a fifth data packet 76 and a sixth data packet 78. These two data packets contain program data which represent a part of a user program which is processed in the control unit 28'. Furthermore, the project data memory 52 contains a seventh data packet 80 which contains parameterization data. These parameterization data are needed, for example, during the processing of the project data and define, for example, value ranges for variables or functionalities.

The actuators 32' and the sensors 30' are also equipped with project data memories 52', 52'', 52''', 52''''. This should not have any restrictive effect. Not all controller hardware components need to have project data memories. Neither is it mandatory that in the project data memory 52 project data 54 are exclusively stored which are processed in the units which are contained in the control unit 28'. In the project data memory 52, project data 54 can also be stored which are needed or processed in a remote controller hardware component. Similarly, data packets from units which are contained in the control unit 28' can also be stored in a project data memory of a remote controller hardware component. The distribution into the individual data packets, shown in FIG. 2, is not to be construed in a limiting manner. It is also feasible to combine different project data, all of which are intended for a data processing unit, for example program data and configuration data, to form one data packet.

The project data memory 52 is designed in such a manner that the project data 54 stored in it are stored in a zero-voltage-proof manner. For this purpose, the project data memory 52 is constructed, for example, as flash memory or as SD card or as CF card.

The project data memory 52, the data broker 60, the event broker 66 and the data bus interface 72 are data processing units. The data bus interface 72 ensures that a data exchange between the control unit 28' and the connecting unit 34 is synchronized, i.e. takes place in accordance with the bus protocol of the data bus used. In this context, the data bus interface 72 controls both the data broker 60 and the event broker 66. Via the event broker 66, data are exchanged between the control unit 28' and the connecting unit 34 and thus another controller hardware component, on the basis of events. For example, the project data to be stored in the project data memory 52 are supplied via the event broker 66 during the distribution process. Furthermore, project data which have been requested by another controller hardware component and which are stored in the project data memory 52 can be supplied to it by the event broker 66.

Via the data broker 60, a data-based data exchange takes place between the control unit 28' and the connecting unit 34 and thus one of the other controller hardware components. For example, controller input signals needed in the control unit 28' are supplied via the data broker 60 or controller output signals generated in the control unit 28' are output.

The project data 54 are present in the form of machine code. To provide for failsafe operation of the control unit 28', two data packets 76, 78 with program data are stored in the project data memory 52. The fifth data packet 76 is intended for the first processor 40 and the sixth data packet 78 is intended for the second processor 42. The fifth data packet 76 comprises a first safety code 82 and a standard code 84. The first safety code 82 comprises the control instructions to be processed via the first processor 40 as a part of the safety tasks to be handled by the control unit 28'. This type of control instructions is called safety control instructions in the text which follows. The standard code 84 comprises the control instructions which are to be processed by the first processor 40 as part of the standard task to be handled via the control unit 28'. Standard tasks are tasks which result from the desired "normal" operating sequence of the installation and which do not have a particularly safety-related significance. This type of control instructions will be called standard control instructions in the text which follows. The sixth data packet 78 comprises a second safety code 86 which comprises the control instructions which are to be handled by the second processor 42. These control instructions will be called safety control instructions in the text which follows.

Depending on the progress of processing, a first safety control instruction 68 and a standard control instruction 90 are processed in the first processor 40. At substantially the same time, a second safety control instruction 92 is processed in the second processor 42.

As part of the processing of the standard control instruction 90 which is a non-safety-related control instruction, first non-safety-related data 94 are exchanged between the first processor 40 and the input/output unit 46. During this process, instantaneous values of non-safety-related controller input signals 48, which are generated by non-safety-related sensors 95, are supplied to the first processor 40. The non-safety-related sensors 95 are those sensors which, for example, detect input variables needed for a drive regulation. These can be, for example, rotational speeds, angles or velocities. The non-safety-related sensors 95 are constructed to be non-failsafe. The input/output unit 46 is supplied with instantaneous values of non-safety-related controller output signals 50, which are supplied to non-safety-related actuators 97 as drive signals. The non-safety-related actuators 97 can be, for example, motors or positioning cylinders. The instantaneous values of the non-safety-related controller output signals 50 are determined in dependence on the non-safety-related controller input signals 48 in accordance with the standard control instructions. In this context, it may be required to determine intermediate quantities, the instantaneous values of which are supplied by means of second non-safety-related data 96 to an active memory 98 where they are temporarily stored.

As part of the processing of the first safety control instruction 88, which is a safety-related control instruction, first safety-related data 100 are exchanged between the first processor 40 and the input/output unit 46. In this process, the first processor 40 is supplied with instantaneous values of safety-related controller input signals 48' which are generated by safety-related sensors 101. The safety-related sensors 101 are, for example, emergency-off pushbuttons, protective doors, speed monitoring devices or other sensors for recording safety-related parameters. The input/output unit 46 is supplied with instantaneous values of safety-related controller input signals 50' which are supplied to safety-related actuators 103 as drive signals. The safety-related actuators 103 are, for example, redundant safety breakers with normally-open contacts which are arranged in the connection between a power supply 102 and the processing station 16. The power supply 102 of the processing station 16 can thus be switched off over two channels as a result of which it is possible to bring at least the processing station 16 into a safe state with the occurrence of a corresponding malfunction. The instantaneous values of the safety-related controller output signals 50' are determined on the basis of the safety-related controller input signals 48' according to the safety control instructions. In this context, it may be required to determine safety-related intermediate quantities, the instantaneous values of which are supplied by means of second safety-related data 104 to the active memory 98 where they are temporarily stored.

In the context of the processing of the second safety control instruction 92 which is a safety-related control instruction, the procedure follows the first safety control instruction 88. With respect to the second safety control instruction 92, third safety-related data 106, which correspond to the first safety-related data 100, and fourth safety-related data 108 which correspond to the second safety-related data 104, are used in corresponding manner.

The reference number 110 identifies project data possibly to be exchanged between individual controller hardware components and thus project data memories 52, 52', 52'', 52''', 52''''.

The representation shown in FIG. 2, according to which both non-safety-related control instructions and safety-related control instructions are processed in the control unit 28', should not be construed as having a limiting effect. It is also feasible that the control unit 28' is designed for the exclusive processing of safety-related control instructions.

Figure 3:
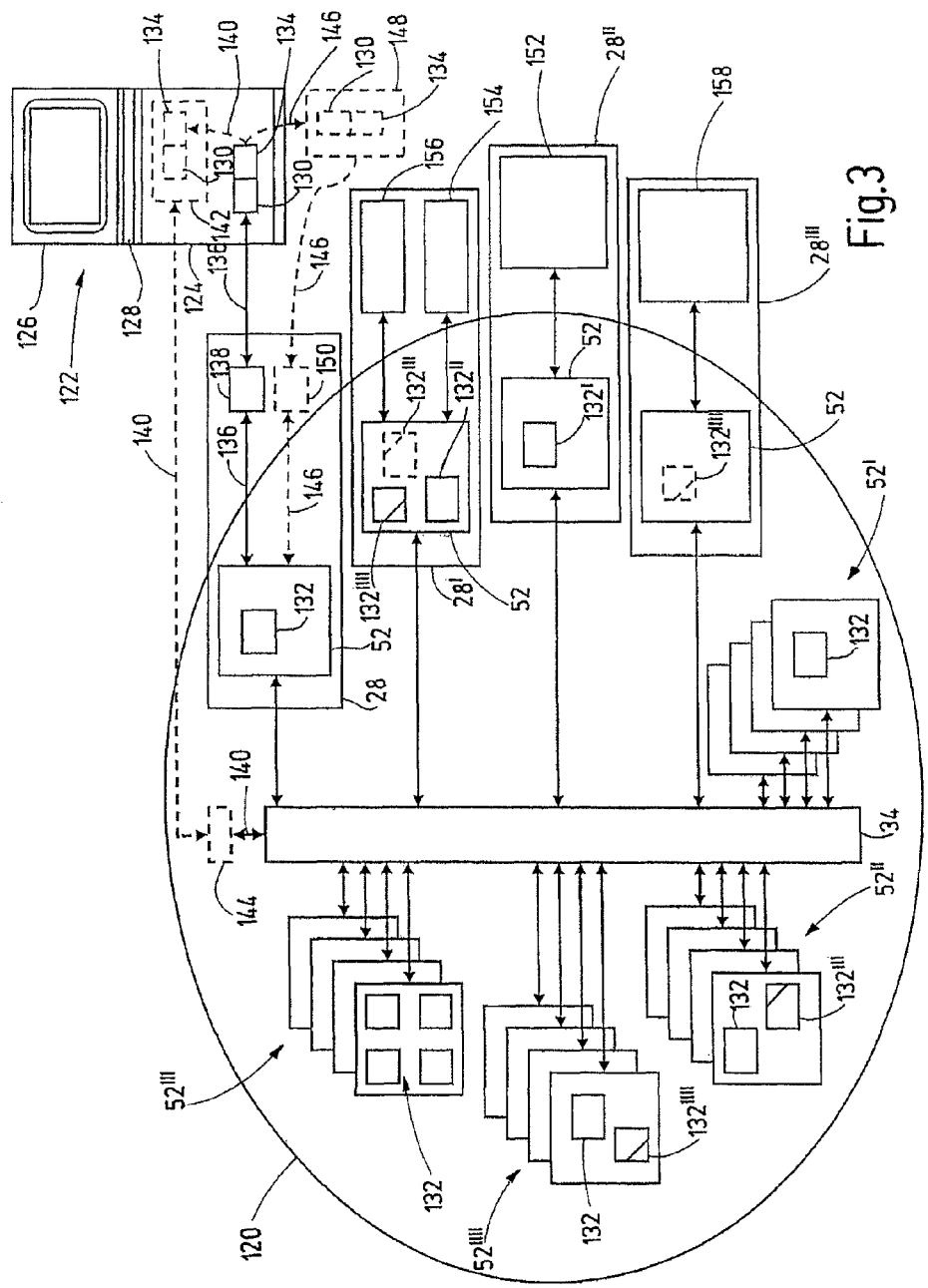
FIG. 3 shows a simplified representation of project data memories present in the novel safety controller.

FIG. 3 shows the project data memories 52 contained in the control units 28, the project data memories 52' contained in the safety-related actuators 103, the project data memories 52'' contained in the non-safety-related actuators 97, the project data memories 52''' contained in the non-safety-related sensors 95 and the project data memories 52'''' contained in the safety-related sensors 101. The individual project data memories are connected to one another via the connecting unit 34. The totality of the project data memories, together forms a virtual project memory 120. For reasons of clarity, the representation of components which may be present between individual project data memories and the connecting unit 34 has been omitted.

In FIG. 3, a programming unit is designated by the reference number 122 in its entirety. The programming unit 122 consists essentially of a computer 124 which is connected to a display unit 126. On the computer 124, a computer program 128 is executed. The computer program 128 enables project data 130 to be generated which represent an application running on the installation to be controlled. The project data 130 in this case comprise program data, configuration data and parameterization data. The computer program 128 is often called a programming tool in technical terminology. The computer 124 can be designed as a PC and the display unit 126 as a monitor.

According to an aspect of the invention, the project data 130 generated with the programming unit 122 and present on the computer 124 are transferred to the project data memories 52, 52', 52'', 52''', 52'''' of a safety controller 24 having a distributed structure. For this purpose, the project data 130 are divided into a plurality of data packets 132, the individual data packets 132 in each case being allocated to one of the project data memories 52, 52', 52'', 52''', 52''''. The project data, more precisely the individual data packets 132, are here distributed to the individual project data memories on the basis of allocation data 134. The allocation data 134 are generated in the programming unit 122. The allocation data 134 can be determined in this context, for example, on the basis of at least one data processing characteristic figure or on the basis of at least one function allocation quantity.

In order to be able to distribute the project data 130 to the individual project data memories 52, they are supplied to a distribution unit. According to the invention, three different procedures are possible in this case. In this context, a safety controller 24 can be constructed in such a manner that a programmer can select one of these three procedures as he wishes. However, it is also feasible that a safety controller 24 is designed in such a manner that only one or even two of the procedures are provided for the transmission of the project data 130.

A first procedure is indicated by a sequence of arrows 136. In this arrangement, both the project data 130 and the allocation data 134 are transmitted, for example, by cable from the programming unit 122 via a first interface 138, provided for this purpose, to the project data memory 52 which is located in the control unit 28. In this case, the distribution unit is a project data memory arranged in the safety controller. The project data memory 52 arranged in the control unit 28 distributes the data packets 132 in accordance with the allocation data 134 to the individual project data memories 52, 52', 52'', 52''', 52'''' contained in the safety controller 24. For this purpose, said project data memory 52 is constructed for being able to forward the project data supplied to it to at least one other project data memory.

A second procedure is represented by a first sequence of arrows 140. In this context, the project data 130 and the allocation data 134 are firstly provided on an external distribution unit 142 contained in the computer 124. The functionality of the external distribution unit 142 in this case corresponds to the project data memory 52 contained in the control unit 28. The project data 130 are then supplied by cable, for example, via a second interface 144, provided for this purpose, to the connecting unit 34 and distributed to the individual project data memories 52, 52', 52'', 52''', 52'''' contained in the safety controller 24, in accordance with the allocation data 134. The external distribution unit 142 does not need to be connected permanently to the safety controller 24. It is sufficient if it is connected, for example, only for the period of the data transmission.

A third procedure is indicated by a second sequence of arrows 146. In this context, both the project data 130 and the allocation data 134 are transferred to a mobile storage medium 148. The mobile storage medium 148 can be, for example, an SD card, a CF card or a USB stick. The mobile storage medium 148 is then introduced into a receiving unit 150 provided for this purpose. The project data 130 are then supplied to the project data memory 52 contained in the control unit 28, which then handles the distribution of the data packets 132 in accordance with the allocation data 134 to the project data memories 52, 52', 52'', 52''', 52'''' contained in the safety controller 24.

With respect to the distribution of the project data 130 to the individual project data memories 52, 52', 52'', 52''', 52'''', different approaches are feasible for this purpose. According to a first approach, the project data are stored essentially on site, i.e. where they are processed. This is represented in FIG. 3 as follows: the control unit 28'' contains a first data processing unit 152. The project data needed by the first data processing unit 152 are stored in the form of a data packet 132' in the project data memory 52 which is contained in the control unit 28''. The first data processing unit 152 can thus call up the project data needed by it directly from this project data memory. In this approach, the allocation data 134 are determined on the basis of at least one function allocation quantity. In this approach, the project data 130 are stored in the controller hardware component in which they are processed.

According to a second approach, the allocation data 134 are determined on the basis of at least one data processing characteristic figure. The data processing characteristic figure can be, for example, the clock frequency of one of the two processors 40, 42 or the data rate of the data broker 60 or of the event broker 66 or the storage capacity of a project data memory 52, 52', 52", 52''', 52''''. In some exemplary embodiments, the parameter is determined automatically by the distribution unit in that the distribution unit queries the project data memory connected to the connecting unit.

In the second approach, the project data 130 are distributed preferably in such a manner that they are stored in controller hardware components which have a high data processing capacity. In this approach, the project data 130 are distributed essentially arbitrarily, i.e. without function allocation, to the project data memories 52, 52', 52", 52''', 52'''' present in a safety controller 24. In FIG. 3, this is shown as follows: the project data needed by a second data processing unit 154 are stored in the form of the data packet 132" in the project data memory 52 which is contained in the control unit 28'. In this case, the project data are thus stored in the control unit in which they are also processed. For a third data processing unit 156 which is also contained in the control unit 28', in contrast, the project data needed by it are not stored in the project data memory 52 which is contained in the control unit 28'. Instead, these project data are stored in the form of a data packet 132''' in one of the project data memories 52". The third data processing unit 156 can then access these project data via the project data memory 52 which is contained in the control unit 28'. In this arrangement, it appears to the third data processing unit 156 that the project data needed by it are stored virtually on the project data memory 52 which is contained in the control unit 28'. This is indicated in FIG. 3 by the data packet 132''' shown dot-dashed. For the third data processing unit 156, the project data memory 52 which is contained in the control unit 28' has the function of a proxy. This project data memory is virtually the gate to the virtual project memory 120 for the third data processing unit 156. In order to provide for an arbitrary distribution of the project data to the individual project data memories, at least a part of the project data memories is designed for automatically forwarding supplied project data to other project data memories and requesting project data from other project data memories. In this context, it is feasible that individual project data memories exhibit both functionalities at the same time. In this approach, it is also feasible to store a minimum volume of project data in the individual project data memories. These are, for example, the project data which are required for booting the safety controller in the respective controller hardware component or data processing unit.

In order to increase the availability of the safety controller 24, at least a part of the project data 130 is stored redundantly in the project data memories 52, 52', 52", 52''', 52''''. This is shown in FIG. 3 as follows: the project data needed by a fourth data processing unit 158 are stored in the form of a data packet 132'''' both in the project data memory 52 which is contained in the control unit 28' and in one of the project data memories 52''''. As described in conjunction with the third data processing unit 156, the project data for the fourth data processing unit 158 are not stored in the project data memory 52 which is contained in the control unit 28'''. Instead, the fourth data processing unit 158 can access either the data packet 132''' which is stored in the project data memory 52 which is contained in the control unit 28' or the data packet 132'''' which is stored in one of the project data memories 52''''. If, for example, the project data memory 52'''', in which the data packet 132'''' is stored, or even the complete controller hardware component in which this project data memory is contained fails, the project data needed by the fourth data processing unit 158 are still available, in this case in the project data memory 52 which is contained in the control unit 28'. It is also possible to store those project data redundantly which are stored primarily in the project data memory which is contained in the control unit in which the project data are processed. For example, this applies to the project data of data packet 132'.

The representation chosen in FIG. 3 should not be construed as having a limiting effect. Safety controllers can be designed differently. Thus, a safety controller can be used in which the non-safety-related sensors, the safety-related sensors, the non-safety-related actuators, the safety-related actuators and the control units are in each case equipped with project data memories as is shown in FIG. 3. However, safety controllers can also be used in which, for example, only the control units are equipped with project data memories. However, the use of safety controllers is also feasible which exhibit a degree of equipment with project data memories lying between these two examples. Apart from the control units, the safety-related sensors and the safety-related actuators are also preferably equipped with data memories. Furthermore, it is not mandatorily required that both the first interface 138 and the receiving unit 150 are arranged in one control unit. Both can be arranged individually or together in an arbitrary controller hardware component. It is also feasible that the interface 138 and/or the receiving unit 150 form a construction unit together with one of the project data memories. Furthermore, it can also be provided that more than one of the project data memories installed in the safety controller can be used as a distribution unit. In addition, the chosen representation in which in each case only one of the project data memories 52', 52", 52''', 52'''', namely that contained in the topmost level of the drawing, contains a data packet, should not have any restrictive effect. For reasons of clarity, the representation of data packets was omitted for the project data memories contained in the levels of drawing located underneath.

Figure 4:
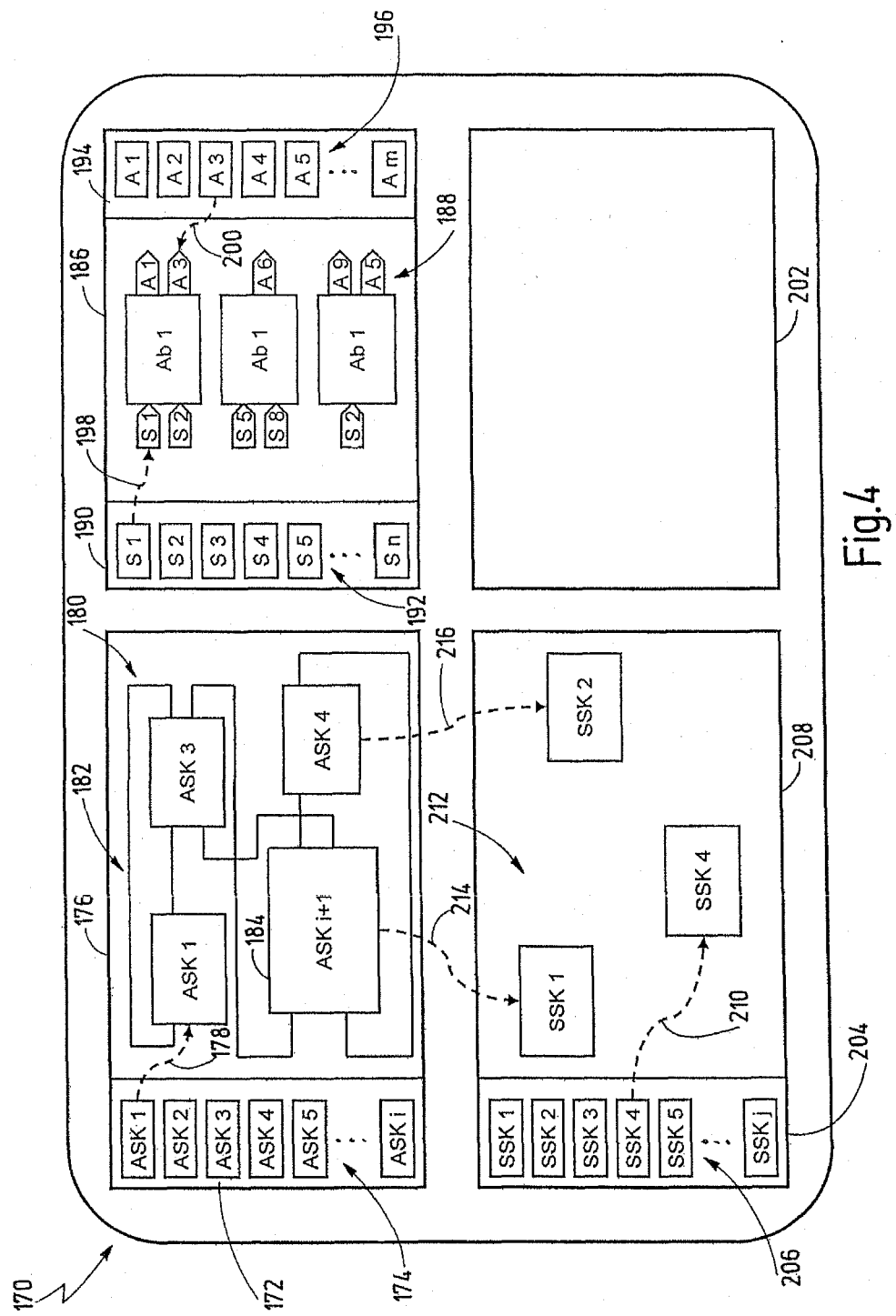
FIG. 4 shows a simplified representation of a graphical interface for creating project data.

In FIG. 4, a graphical interface is designated by reference number 170 in its entirety. This graphical interface enables a programmer to generate the project data 130. Altogether, program data, configuration data and parameterization data are generated.

The graphical user interface 170 contains a installation software component array 172 which contains a plurality of predefined installation software components 174 in the form of graphical symbols. The user program, and thus the program data, are created by providing a plurality of installation software components. For this purpose, the graphical user interface 170 contains a first component array 176. The installation software components to be provided are selected and transferred into the first component array 176 as is indicated by an arrow 178. The first component array 176 thus contains a plurality of installation software components 180 provided. A component subprogram is generated by logically combining the installation software components 180 provided. For this purpose, logic inputs and logic outputs of these installation software components are connected to one another which is represented by a plurality of connections 182. In addition to the selection of predefined installation software components, new installation software components can also be created as is indicated by the new installation software component 184. The individual installation software components can be so-called elementary components which, themselves, contain no further software components. However, they can also be so-called group components which themselves contain further software components. An elementary component contains a number of aspect blocks. Each of these aspect blocks is allocated to one of several mutually different controller aspects, each of these controller aspects representing an independent part aspect of the safety controller. The installation software component contains in this case all the aspect blocks which are of significance to the installation hardware component which is represented by the installation software component. In comparison with an elementary component, a group component contains, apart from the aspect blocks, additionally software components which can be designed as elementary or else group components. By using group components, a user program having a number of hierarchy planes can be created.

Mutually different controller aspects can advantageously be the following controller aspects: standard controller aspect, safety controller aspect, diagnostic aspect, display aspect, entry control aspect, cooling aspect, access authorization aspect, maintenance aspect, locking aspect, manual operation aspect or data management aspect.

For each aspect block contained in a installation software component, at least those logic quantities and/or those parameters and/or those sensor signals which are needed for processing it must be supplied to the aspect block via associated inputs, and those logic quantities and/or those parameters and/or those output signals which are in each case determined in the number of aspect blocks and output by the aspect block via associated outputs, are initially specified from the bottom up. Specifying the actual sensors and/or actuators which are connected to the respective aspect block is lastly done only during the generation of the user program. Furthermore, a function program which specifies aspect characteristics of the installation software component for the controller aspect to which the respective aspect block is allocated, is stored in each case at least in a part of the aspect blocks contained in a installation software component.

The graphical interface 170 also contains an aspect array 186. In this aspect array 186, a plurality of aspect blocks 188 is arranged. Each of these aspect blocks is allocated to the same controller aspect. In this context, the plurality of aspect blocks 186 comprises the aspect blocks contained in all hierarchy planes of the user program.

The graphical interface 170 also contains a sensor array 190. In this sensor array 190, a plurality of graphical sensor symbols 192 is arranged. For each sensor contained in the installation to be controlled, a graphical sensor symbol is provided in this arrangement. The graphical interface 170 contains an actuator array 194 as a further array. In this actuator array 194, a plurality of graphical actuator symbols 196 is arranged. For each actuator contained in the installation to be controlled, a graphical actuator symbol is provided in this context. For the plurality of aspect blocks 188 contained in the aspect array 186, an aspect subprogram is created. For this purpose, so-called I/O mapping is performed at least for a part of the aspect blocks both for the inputs and for the outputs thereof. That is to say, at least a part of the signal inputs is allocated to those sensors, the sensor signals of which are processed in the respective aspect block. This is shown by an arrow 198 by way of example. In addition, actuators which are driven with the output signals determined in the respective aspect block are allocated to at least a part of the controller outputs. This is indicated by an arrow 200 by way of example. As an alternative, the I/O mapping can also be performed by text inputs into an input field 202.

The graphical interface 170 contains a controller software component array 204 which contains a plurality of predefined controller software components 206. Each of these controller software components 206 represents a controller hardware component which can be used in a safety controller 24 with distributed structure. The controller hardware components are, for example, control units, sensors or actuators.

The graphical interface 170 also contains a second component array 208. In this second component array 208, the programmer of the user program can insert the controller software components which represent the controller hardware components with which the distributed safety controller 24 is constructed. This is done by the selection of individual controller software components 206 and transferring into the second component array 208 as is indicated by an arrow 210 by way of example. The second component array 208 thus contains a plurality of controller software components 212 provided. If the programmer wishes to specify at least for a partial extent of the user program which project data are to be stored in which controller hardware component, more precisely in which project data memory, he can allocate at least a part of the installation software components 180 provided to the controller software components 212 provided. This is indicated by arrows 214, 216. From these allocations, function allocation quantities are generated on the basis of which the allocation data 134 are then determined. In the determination of the function allocation quantities, the connections 182 between the individual installation software components 180 can also be taken into consideration. Furthermore, the I/O mapping performed for the aspect blocks can also be taken into consideration.

However, the allocation data 134 can also be determined automatically, i.e. without the programmer performing an allocation. For each controller hardware component 26 represented by a controller software component 212, at least one data processing characteristic figure is stored in a database so that the allocation data 134 can be determined, for example, on the basis of these data processing characteristic figures. In this case, the distribution of the project data 130 to the individual project data memories is performed from the point of view of the data processing capacity of the individual controller hardware components. The following procedure is also feasible: the programming tool is designed in such a manner that the programming unit, before beginning the distribution process, first sends enquiries to the individual controller hardware components in order to determine the data processing characteristic figures in each case.

With respect to the determination of the allocation data 134, various embodiments are feasible: in a first embodiment, the allocation data 134 are determined exclusively on the basis of data processing characteristic figures. In this case, the project data are distributed in accordance with the data processing capacity of the individual controller hardware components. In a second embodiment, the allocation data 134 are determined exclusively on the basis of function allocation quantities. In which context, the function allocation quantities represent those allocations which are specified by the programmer by allocating individual installation software components to individual controller software components. In this case, the programmer specifies the distribution of the project data to the individual project data memories. The function allocation quantities represent a memory location, especially a project data memory, which is defined by the vicinity of project data to be processed and data needed for this purpose which, for example, originate from a sensor or a further control unit. In a third embodiment, the allocation data 134 can be determined both on the basis of data processing characteristic figures and on the basis of function allocation quantities. In this case, it is feasible that, by using the data processing characteristic figures, a proposal for the allocation of the project data 130 to the individual project data memories is first generated which can still be altered by the programmer in accordance with his concepts. In this context, this is a two-stage procedure. Firstly, a distribution of the project data is proposed from the point of view of the data processing capacity which can then be altered by means of the point of view of the function allocation.

For the predefined controller software components 206, predefined configuration data can also be stored in a database. The project data 130 thus also contain the associated configuration data automatically by providing controller software components. However, the possibility also exists to modify or generally specify configuration data during the creation of the user program, for example by means of corresponding inputs into the input field 202. This can also be done, for example, after the user program has been created. For the aspect blocks 188, parameterization data can be stored correspondingly in a database. In addition there is also the possibility, as in the case of the configuration data, to modify these or generally specify them.

Figure 5:
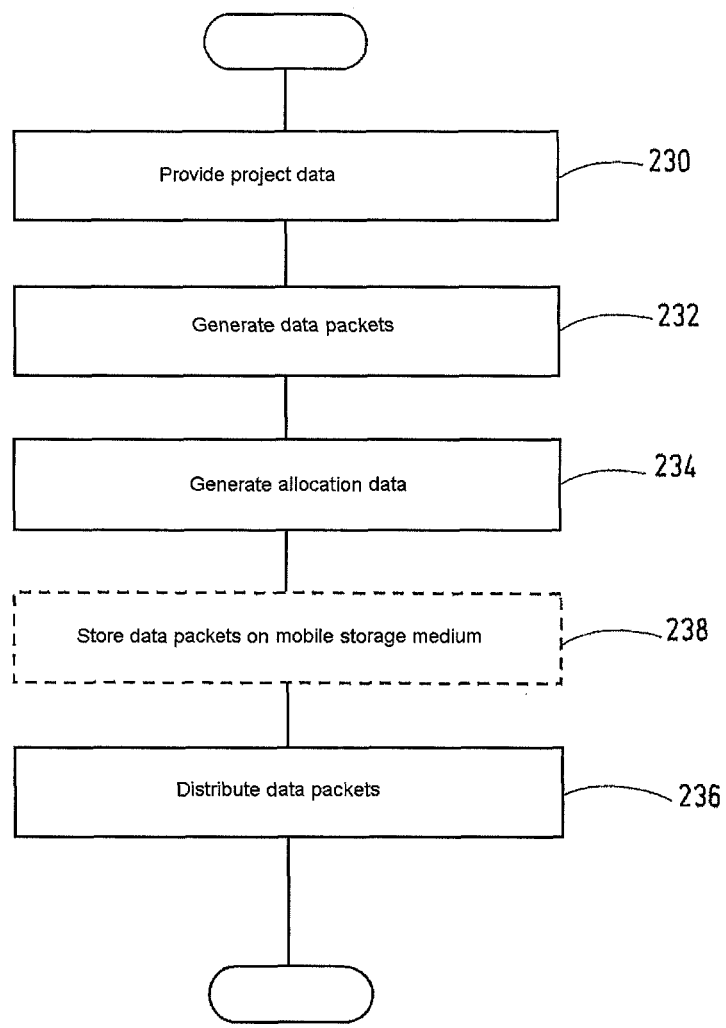
FIG. 5 shows a simplified flowchart for explaining the novel method.

The flowchart shown in FIG. 5 shows the sequence of the novel method.

According to a step 230, the project data 130 are provided. In a subsequent step 232, the data packets 132 are generated. This is followed by a step 234 in which the allocation data 134 are generated. In a step 236, the individual data packets 132 are then distributed to the individual project data memories 52, 52', 52", 52''', 52'''' according to the allocation data 134. Depending on the procedure according to which the data packets are distributed, step 236 does not immediately follow step 234. If the data packets are distributed by using a mobile storage medium 148, a step 238 is executed between step 234 and step 236, in which step 238 the data packets 132 and the allocation data 134 are stored in the mobile storage medium 148.

Figure 6:
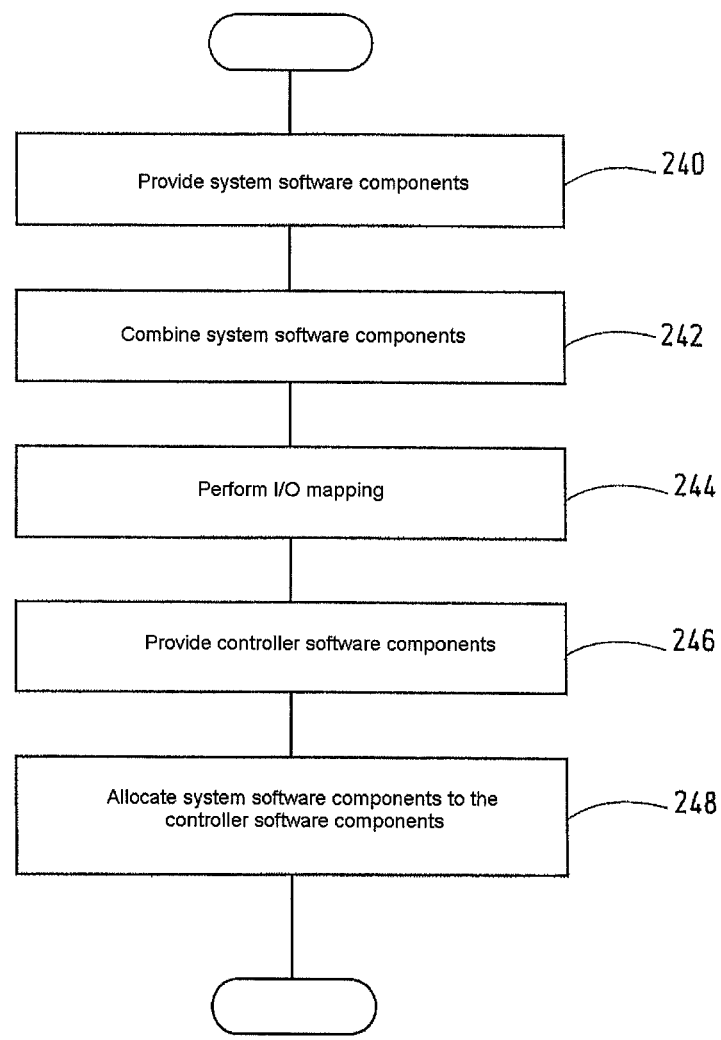
FIG. 6 shows a simplified flowchart for explaining the provision of project data.

The flowchart shown in FIG. 6 shows the basic procedure in providing the project data 130.

In a step 240, installation software components 180 are provided. In a subsequent step 242, the installation software components 180 provided are combined. This is followed by a step 234 in which the sensors and actuators are specified for the individual aspect blocks 168, i.e. the so-called I/O mapping is carried out. In a subsequent step 246, controller software components 212 are provided. In a subsequent step 248, the installation software components 180 provided are allocated to the controller software components 212 provided.

What is claimed is:

1. A safety controller for controlling an automated installation on the basis of project data, wherein the project data define an application running on the installation, comprising:
   a plurality of controller hardware components having a plurality of project data memories, wherein a first one of the controller hardware components comprise a first and a second data processing unit and a first project data memory, and wherein a second one of the controller hardware components, which is remote from the first controller hardware component, comprises a further data processing unit and a second project data memory, with the first and second project data memories each being designed for storing project data supplied to them,
   a connecting unit via which the first and second controller hardware components are connected to one another,
   a distribution unit that is designed for distributing at least some of the project data via the connecting unit to the first and second project data memories, and
   a programming unit for allowing a user to generate the project data, wherein the programming unit is designed for generating allocation data, and wherein the distribution unit is designed for distributing the project data to the project data memories on the basis of the allocation data;
   wherein first project data needed by the first data processing unit for operating the first controller hardware component are stored in the first project data memory, and wherein second project data needed by the second data processing unit for operating the first controller hardware component are stored in the second project data memory, and
   wherein the programming unit is further designed for determining the allocation data on the basis of data processing characteristic figures representing a respective data processing capability of the plurality of controller hardware components.

2. The safety controller of claim 1, wherein one of the project data memories comprises the distribution unit.

3. The safety controller of claim 1, wherein the distribution unit is a separate unit connected to an interface provided for this purpose in the safety controller.

4. The safety controller of claim 1, wherein at least one of the project data memories is further designed for forwarding project data received to at least one other project data memory, or for requesting project data stored in another project data memory.

5. The safety controller of claim 1, wherein the controller hardware components are control units, sensor units or actuator units, and wherein at least one sensor unit or actuator unit contains a project data memory where a part of the project data is stored.

6. The safety controller of claim 1, wherein the project data are divided into a plurality of data packets, with the data packets each being allocated to at least one of the project data memories.

7. The safety controller of claim 1, wherein the data processing characteristic figure represents at least one of the following: a microprocessor clock frequency, a data transfer rate, and a storage capacity of a project data memory.

8. The safety controller of claim 1, wherein the programming unit is designed for determining the allocation data on the basis of at least one function allocation quantity.

9. The safety controller of claim 1, wherein at least some of the project data is stored redundantly in at least two project data memories.

10. The safety controller of claim 1, wherein the project data comprise at least one of the following: program data, configuration data and parameterization data.

11. The safety controller of claim 1, wherein at least some of the project data memories are designed for storing the respectively supplied project data in a zero-voltage-proof manner.

12. A method for controlling an automated installation on the basis of project data loaded onto a safety controller, wherein the project data define an application implemented on the installation, wherein the safety controller comprises a plurality of controller hardware components connected to one another via a connecting unit, said controller hardware components having a plurality of project data memories, wherein a first one of the controller hardware components comprises a first and a second data processing unit and a first project data memory, and wherein a second one of the controller hardware components, which is remote from the first controller hardware component comprises a further data processing unit and a second project data memory, and wherein the first and second project data memories each are designed for storing project data, the method comprising the steps of: generating the project data using a programming tool,
   generating allocation data using the programming tool, wherein the allocation data is determined on the basis of data processing characteristic figures representing a respective data processing capability of the plurality of controller hardware components, dividing the project data into at least a first project data packet needed by the first data processing unit for operating the first controller hardware component and a second project data packet needed by the second data processing unit for operating the first controller hardware component, and distributing the project data across the controller hardware components on the basis of the allocation data by transferring the first project data packet to the first controller hardware component and storing the first project data packets in the first project data memory, and by transferring the second project data packet to the second controller hardware component and storing the second project data packet in the second project data memory.

\* \* \* \* \*